United States Patent
McRae et al.

(10) Patent No.: US 7,571,216 B1
(45) Date of Patent: Aug. 4, 2009

(54) NETWORK DEVICE/CPU INTERFACE SCHEME

(75) Inventors: Andrew McRae, Berowra (AU); Sanjeev A. Mahajan, Sunnyvale, CA (US); David James Stewart, Tewksbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 914 days.

(21) Appl. No.: 10/677,788

(22) Filed: Oct. 2, 2003

(51) Int. Cl.
   *G06F 15/167* (2006.01)
   *G06F 15/16* (2006.01)
   *G06F 13/28* (2006.01)

(52) U.S. Cl. .................. 709/213; 709/250; 711/153

(58) Field of Classification Search .............. 709/250, 709/213; 711/167; 370/466
   See application file for complete search history.

(56) References Cited

U.S. PATENT DOCUMENTS 6,094,729 A * 7/2000 Mann ................. 714/25
6,279,052 B1 * 8/2001 Upadrastra ................. 710/22
6,876,653 B2 * 4/2005 Ambe et al. ................. 370/389
6,912,637 B1 * 6/2005 Herbst ................. 711/167
7,020,133 B2 * 3/2006 Zhao et al. ................. 370/371
7,289,443 B1 * 10/2007 Costello ................. 370/231
2002/0174252 A1 * 11/2002 Hayter et al. ................. 709/250
2002/0174255 A1 * 11/2002 Hayter et al. ................. 709/250
2003/0099254 A1 * 5/2003 Richter ................. 370/466

OTHER PUBLICATIONS

"I/O Control Block Rings", retrieved from the internet Oct. 9, 2003: <http://www.cs.wpi.edu/~claypool/mqp/raid/html/node56.html>.
Broadcom Corporation, *BCM 1250 Product Brief*, copyright 2002 by Broadcom Corporation, Irvine, California.

* cited by examiner

*Primary Examiner*—William C Vaughn, Jr.
*Assistant Examiner*—Joiya M Cloud
(74) *Attorney, Agent, or Firm*—Charles E. Krueger (57) ABSTRACT

A system and method for implementing a CPU/Network Device Interface that reduces the CPU involvement in managing the interface. New data structures in shared memory that are either read-only or write-only by CPU allow the CPU to efficiently utilize techniques such as write-posting and cache prefetching. Additionally, hardware-assisted packet transmission and high-level packet flow control reduce the burden on the CPU. A fair allocation system assures fair access to the receive interface by multiple line cards.

3 Claims, 6 Drawing Sheets

Table 1: Data structure access

| Resource | CPU | Device |
|---|---|---|
| RX Buffer pool | Write only | Read only |
| Status ring | Read only | Write only |
| TX FIFO | Write only | Internal resource |
| Device RX Registers | Write only | Internally maintained |
| Device TX Registers | Read only | Internally maintained |

Fig. 3

Table 2: Device Registers

| Register | CPU Access | Use |
|---|---|---|
| RX Buffer Count | Write only accumulator | Contains the count of the available buffers in the receive buffer pool. |
| Free Status Ring Entries | Write only accumulator | Contains the count of free status ring entries. |
| TX FIFO Free entries | Read only status | Contains the count of free transmit FIFO entries. |

Receive packet

Transmit complete of packet

Receive packet with error

Transmit complete with error

Status ring overflow

QStatus Information

| 63 | 56 55 | 48 47 | 40 39 | 32 31 | 24 23 | 16 15 | 8 7 | 0 |
|---|---|---|---|---|---|---|---|---|
| TIF# - 00h | TIF# - 01h | TIF# - 02h | TIF# - 03h | TIF# - 04h | TIF# - 05h | TIF# - 06h | TIF# - 07h | |
| TIF# - 08h | TIF# - 09h | TIF# - 0Ah | TIF# - 0Bh | TIF# - 0Ch | TIF# - 0Dh | TIF# - 0Eh | TIF# - 0Fh | |
| TIF# - 10h | TIF# - 11h | TIF# - 12h | TIF# - 13h | TIF# - 14h | TIF# - 15h | TIF# - 16h | TIF# - 17h | |
| TIF# - 18h | TIF# - 19h | TIF# - 1Ah | TIF# - 1Bh | TIF# - 1Ch | TIF# - 1Dh | TIF# - 1Eh | TIF# - 1Fh | |
| . | . | . | . | . | . | . | . | |
| . | . | . | . | . | . | . | . | |
| . | . | . | . | . | . | . | . | |
| . | . | . | . | . | . | . | . | |

Table Base Address ↑ Size ↓

Table Entry

| 7 | | | | | | | 0 |
|---|---|---|---|---|---|---|---|
| . | . | . | . | . | . | . | S |

Size = (Max TIF #) / 8

Fig. 11

QStatus XON Entry Format

V = Valid bit, Code = 000, Action = *QStatus Code*, IF# = Interface Number

NETWORK DEVICE/CPU INTERFACE SCHEME

BACKGROUND OF THE INVENTION

Figure 1:
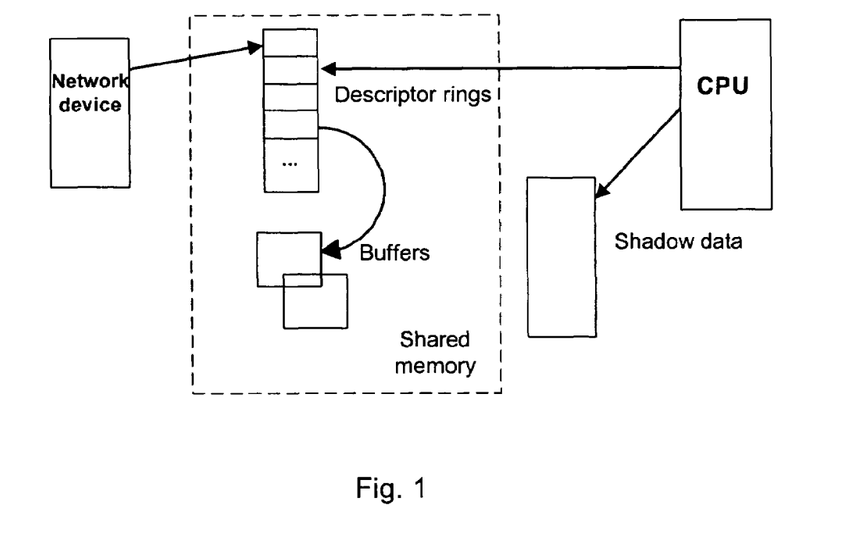
FIG. 1 is a block diagram of a conventional interface utilizing data structures in a shared memory.

One architecture, depicted in FIG. 1, that is commonly used for network devices is a single device interface including a centralized shared memory scheme, where a CPU and network device communicate via a shared memory. Various schemes are used to manage this interface, with a very common and popular scheme being a set of ring descriptors containing the common data, where a device will use descriptor rings accessed by both the device and CPU. For example in the receive mode, these descriptor rings work by the CPU initializing each entry with a buffer address/length, and setting a device OWN bit.

The device will be polling the descriptor ring, and when a packet is received, the next descriptor is used to indicate where to put the data. After a block of data is received, the descriptor is updated by the device with a received length and the OWN bit cleared. The CPU will check the descriptor entry (maybe driven by an interrupt) and if the OWN bit is clear, use the status value stored in the descriptor to process the received buffer. Usually, the CPU keeps a shadow copy of the descriptor ring to hold management information, such as the metadata of the buffers.

The transmit side is usually similar to the receive side, except that the CPU has to revisit the ring to process the completed transmission of the packet.

This scheme has been used for many devices, but has some drawbacks:
  Because the OWN bit is used to indicate ring entry ownership, the CPU and device have to read and write the same memory. Thus, the memory cannot be cached by the CPU without performing an invalidate for every access to the ring.
  When the descriptor is read by the CPU, it contains data that is not used by the CPU, i.e., the buffer address and length. Thus the amount of data to be read by the CPU in processing the ring is larger than it need be.
  To reduce the cost of reading the ring, sometimes the CPU can access the descriptors via a cached view of the memory, and also prefetch the data. By having larger descriptors, the number of descriptors read in each cache line is reduced.
  Because each descriptor is based on a scatter/gather buffer, several ring descriptor entries may have to be processed for each packet.
  Often the receive and transmit rings have similar descriptors, but this does not need to be the case.

Whilst this has been in common use, it is not an optimal scheme, especially as network interfaces have become faster, and CPUs are not keeping up with the processing of packets using a standard ring descriptor scheme. Another factor is that more modern CPUs generally have caches that allow data to be processed in chunks, support write posting (where I/O writes proceed without stalling the CPU), and cache prefetching, which allows early prefetch of data without having to stall the CPU. Some newer CPUs are even I/O cache coherent, which means that if a device is accessing the same memory as the CPU, this causes the corresponding cache lines to be automatically invalidated in the CPU.

Another issue is avoiding one fast interface from monopolizing all available resources when only a single interface is used to multiplex tx/rx (transmit/receive) streams from multiple line cards and interfaces.

Accordingly, a shared-memory scheme that utilizes CPU resources in a more efficient way and that can avoid interface monopolizing is required.

Another bottleneck with existing systems is that a typical packet transmission involves a CPU writing one or more buffer addresses and control information into one or more transmit descriptors of the controller chip. After notification of the new data, the controller chip reads the data from the buffer and transmits on the egress path. After transmission the controller updates the descriptor to indicate completion of the operation to the CPU which cleans up and prepares for the next transmission.

A system, designed by the assignee of the present application, utilizes a Broadcom 1250 CPU connected to an HT-FPGA (Field Programmable Gate Array) over the Hyper-Transport® (HT) bus as one of its egress paths. The HT-FPGA connects the line cards to the HT interface of the processor. It is responsible for delivering the packets from the line cards into the processor packet memory in the ingress direction and pulling the packets off the memory and transmitting them to the line cards in the egress direction. It is also responsible for handling the line card egress flow control.

A transmit descriptor ring is used to pass packet buffers for transmission by the HT-FPGA. The HT-FPGA reads the descriptor ring to get the pointer to the buffer for transmission then programs CPU resources to perform the data reads and sends on the egress path. Data transmission and manipulation of the descriptor ring has to be done over the HT bus. The HT bus is very inefficient on read operations but is very efficient on write operations.

The inefficiency of read operations on the HT bus is related to the following: 1) that memory accesses have to be tightly coupled to the HT read command from an external device, and 2) the number of outstanding HT transactions supported at any given time is limited.

Having memory accesses tightly coupled to the HT read command reduces the efficiency of read operations because the device must wait for a response from the target device causing increased latency, and since the number of transactions supported is limited, and HT read transactions can only be issued as long as support for the transaction is available.

On the other hand HT write operations are very efficient for several reasons: HT writes are posted and the writes can be overlapped for efficient pipelining, more HT write transactions can be outstanding than HT read transactions at any time due to the amount of required logic to support read transactions, and, having more outstanding transactions to be in process at any time causes the HT write transactions to be more efficient than HT read transactions due to the increased pipelining.

One approach to taking advantage of the write efficiency of the HT bus is to write the transmit directly to the HT-FPGA. This can be done in two ways.

A first approach is where the CPU writes the data directly to the HT-FPGA. This approach is very CPU intensive and not desirable as the CPU is not doing useful work. Also there is a limit to the number of writes that can be posted by the CPU.

A second approach is to use a DMA (Direct Memory Access) engine to transfer the data to the HT-FPGA over the HT bus. Even though the second approach is faster, the CPU still has to program the data mover and maintain its descriptor rings. Programming the data mover involves device write cycles which are slower than the memory write cycles which are cached and posted and also involves handling of an extra interrupt coming from the data mover which wastes time in a context switch.

Accordingly improved techniques are needed for transmitting packet data without wasting precious CPU cycles.

Another waste of precious CPU cycles occurs during a typical high level packet flow control process, which involves the CPU receiving xon/xoff flow control status from an interface by using either polling, interrupt, or event messaging techniques. The CPU then writes the information to an xon/xoff table for use by the software packet transmit routine.

Each entry in the xon/xoff table represents the packet transmit status for a specific interface. A transmit routine checks the xon/xoff table for a specific interface prior to packet transmission. If the interface table entry indicates an xon status the packet is transmitted. If the interface table entry indicates an xoff status then the packet is placed in a holding queue until the interface entry status has been updated to indicate an xon status. When transitioning an interface table entry from an xoff to xon status, the CPU must check if packets are in the holding queue awaiting transmission to the interface. The packets are then placed back on the transmit queue to be transmitted to the interface.

This typical packet flow control technique is CPU intensive and requires many CPU cycles to implement the polling and updating of the xon/xoff table entries. A technique that utilizes fewer precious CPU cycles would be valuable.

BRIEF SUMMARY OF THE INVENTION

One embodiment of the invention is a new method of CPU/network device interfacing that takes full advantage of the facilities of modern CPUs, with an emphasis on requiring minimal CPU costs (maximum CPU performance) when interacting with the network device. Also supported is the use of this interface for multiplexing multiple line cards without having one line card unfairly monopolizing the available resources.

Another embodiment of the invention includes elements for: taking advantage of posted writes; using private shadow data available only to the CPU to avoid replication of data in the descriptor rings; not using memory which is both read and write from both the CPU and the network device; avoiding the use of OWN bits to remove the need to rewrite descriptors after they have been processed; arranging the data structures to allow maximum data to be obtained in a single cache line; using budget counters to manage the allocation of resources when the interface is used to multiplex several line cards; and offloading management of the DMA descriptors to hardware so that the CPU does not need to be involved.

In another embodiment of the invention, an Rx (receive) buffer pool which is write-only by the CPU and read-only by the device and a Status Ring which is write-only by the device and read-only by the CPU are maintained in shared memory. The status ring entries are small and many entries can be prefetched to the cache for quick access by the CPU.

In another embodiment of the invention, the status ring entries include a valid bit which is toggled by the device on each access to indicate the end of the ring.

In another embodiment of the invention fair access to the receive interface by a plurality of line cards is provided by utilizing LC budget values for each line card.

In another embodiment of the invention, a CPU module having a data mover utilizes a data mover descriptor ring, maintained by an interface module, to program the data mover to transfer packet data from memory without using precious CPU cycles.

In another embodiment, the data mover aligns byte data on the fly for efficient transmission as word-aligned data.

In another embodiment of the invention, an xon/xoff table is maintained without CPU intervention. The CPU is interrupted only during an xoff to xon transition so that the CPU can service holding queues.

Other features and advantages of the invention will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

An embodiment of the invention will now be described that address many of the problems described above. This embodiment includes a novel interface between the CPU and the device. Some of the underlying assumptions that underpin this interface are:

The primary performance bottleneck of the system will be the CPU and not the I/O subsystem, nor likely the memory subsystem, so a strong goal is to minimize CPU stalls and inefficiencies.

Memory latency is an issue to varying degrees depending on the memory or devices being accessed, e.g., reading a device register via the device memory bus may mean a significant stall for the CPU, with progressively less impact for accesses to main memory, L2 cache, and L1 cache.

CPU writes are posted, but generating more writes than the post buffers can accept will cause CPU stalls, e.g., if a series of writes were performed to a device, the first writes will be posted, but beyond that, the CPU may stall (the number of writes before stalling is dependent on the specific CPU).

Advantage should be taken of the fact that the CPU is keeping shadow data in non-shareable memory.

Thus, one of the objectives of the presently described embodiment is to provide an interface that optimizes the CPU utilization, takes advantage of prefetching and caching, and minimizes the shared memory accesses and reads that may stall the CPU. The arrangement of the data structures is depicted in FIG. 2.

Figure 2:
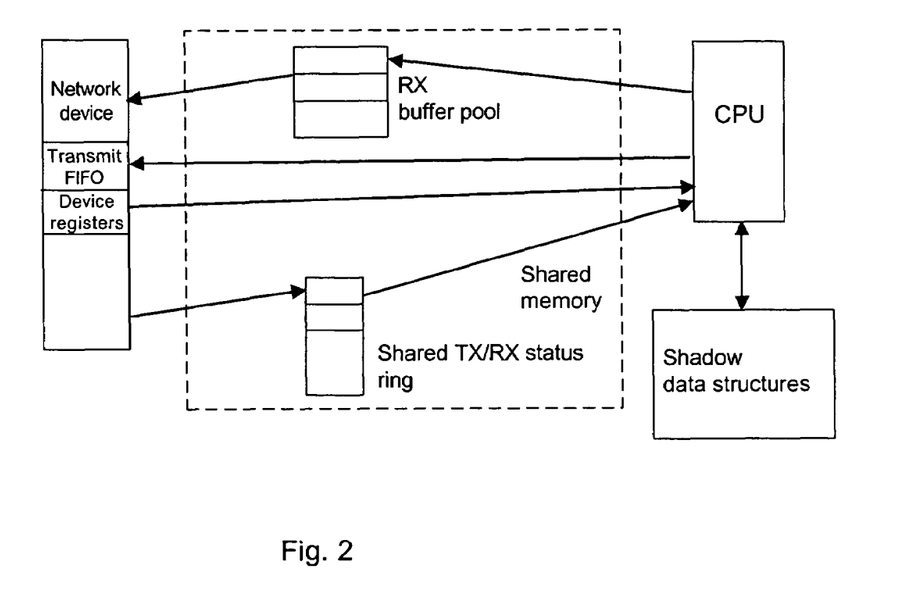
FIG. 2 is a block diagram of the data structures utilized in an embodiment of the invention.

FIG. 2 is a high-level block diagram depicting a CPU connected to, for example, a memory holding shadow data structures, a network device including a transmit FIFO and device registers, and a shared memory holding an Rx buffer pool and a shared Tx/Rx status ring. The arrows show the direction of read/write data.

The data structure layout depicted in FIG. 2 is designed to minimize the CPU cost of managing the device and optimize the use of caching to retrieve multiple data elements without having to undergo cache coherency invalidation costs. An important feature is the use of shadow data structures that can be held in cacheable CPU memory, as a way of avoiding placing extraneous data into shared memory data structures.

Figure 3:
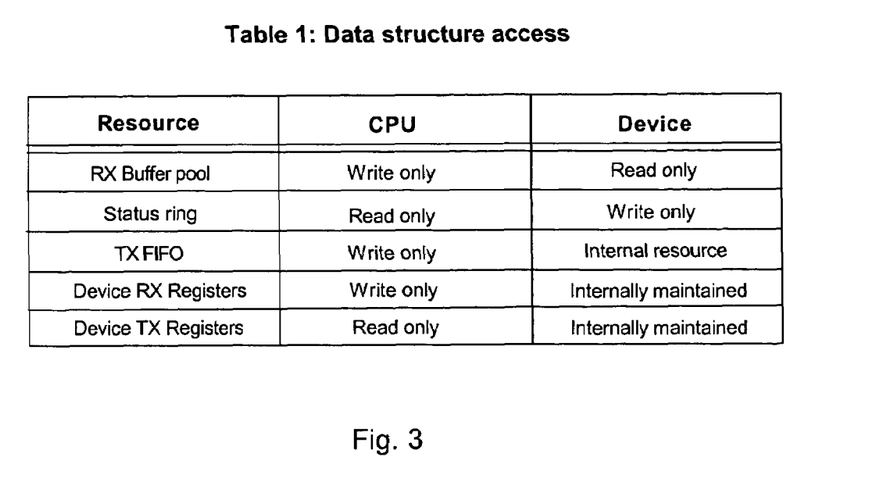
FIG. 3 is a table listing data structure access rules in an embodiment of the invention.

Another feature is the use of data structures that are read or write only from either the CPU or device. FIG. 3 is a table that lists the data structure access rules.

When resources are write only from the CPU, they can be accessed via an uncached view (or a cached view using cache-write-through) using posted writes; these resources are read-only from the device's perspective, so that the CPU does not undergo any cache coherency problems (causing stalls). If they are read only from the CPU's viewpoint, they can be candidates for prefetching into a cached view.

Resource Descriptions

Device Registers

Figure 4:
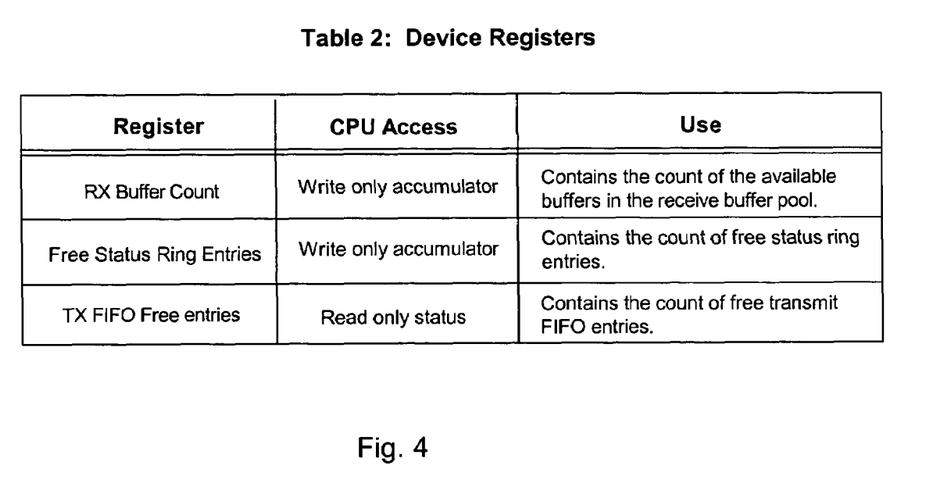
FIG. 4 is a table listing register access rules in an embodiment of the invention.

The device is initialized via a set of registers having access rules depicted in the table of FIG. 4. Some registers are used at initialization time to set the addresses and size of the various resources. Others are accessed as part of the normal operation of the device, and are used as follows (all are 16 bit registers).

Accumulator registers are internal device counters that can be updated by the CPU by writing a value to them—the value will be atomically added to the internal counter. Thus writing a value of 0 will be a null operation on that counter. Potentially, if the device registers are adjacent in the device's address map, multiple registers can be updated using a single write from the CPU. Upon a device reset, it is assumed these counters will be cleared.

Rx Buffer Pool.

Figure 5:
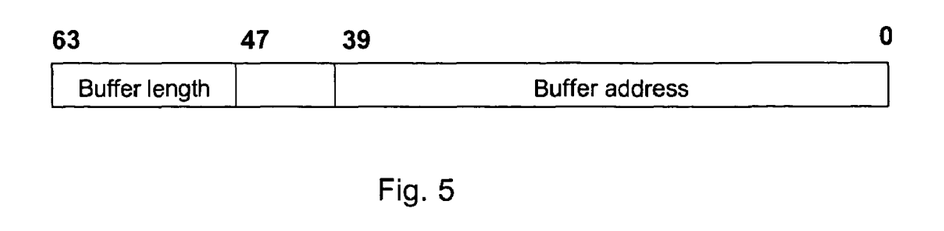
FIG. 5 is a diagram depicting the format of an Rx buffer pool entry in an embodiment of the invention.

The receive buffer pool is a shared memory data structure consisting of an array of 64 bit entries. The format of each entry is depicted in FIG. 5.

The entry contains a buffer address, pointing to a scatter/gather buffer. The buffer length indicates the size of the buffer. The Rx buffer pool is a list of the scatter/gather data buffers that the device uses to store the incoming data. The device is programmed with a start/end address (or a start address/count) of the array so that when the last entry in the array is used, the device will wrap to the start of the array. The device register Rx Buffer count contains the number of current valid buffers available to the device.

The typical use of this buffer pool is:
1. The CPU will initially populate the array with scatter/gather buffers, and write the number of buffers into the Rx Buffer Count device register.
2. As the device receives data, it will read the buffer pool array sequentially to obtain buffers to place the data into. Since the device has been programmed with the count of valid buffers, it can prefetch a number of buffers in one transaction to minimize overhead and latency.
3. As each buffer is used, the Rx Buffer Count is decremented.
4. After the CPU processes the received packets, it will repopulate the used entries. Once it has done so, it can update the Rx Buffer Count device register by writing the number of new entries. This will be accumulated into the Rx Buffer Count. Since the buffer pool is write only from the CPU, it can live in uncached space or cache-write-through space so that the CPU can update the pool using posted writes or a cache-line at a time. The CPU maintains a private shadow copy of the scatter/gather buffers, but in a software convenient format (e.g., a linked list of the scatter/gather private headers).

Transmit FIFO

Figure 6:
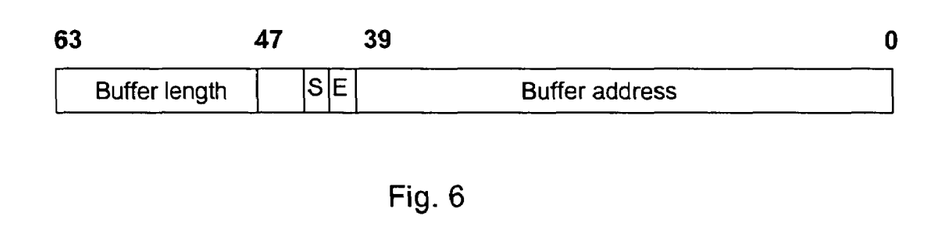
FIG. 6 is a diagram depicting the format of a Tx (transmit) FIFO entry in an embodiment of the invention.

The Transmit FIFO is a device resource whereby the CPU delivers packets to be sent. The FIFO appears to the CPU as a single 64 bit register, which the CPU will write. FIG. 6 depicts the format of a transmit FIFO entry.

The S and E flags indicate the Start and End of packet, respectively. It is assumed that the device would not start to transmit a packet until the last buffer (i.e., the buffer flagged with an E) is in the FIFO. The CPU transmits a packet by writing sequential entries into the FIFO. The Tx FIFO Count register is used by the CPU to know how many free entries there are in the FIFO, so that no overflow occurs.

Rather than reading this value every time a packet is to be transmitted, the CPU will maintain a shadow count, and only read the device register when the shadow count goes to zero (the value could even be prefetched to avoid stalls). This conceivably could be implemented in shared memory as a transmit ring, but this implies the device either has to poll the shared memory ring for new packets to send, or the CPU must inform the device when new data has been placed on the ring for transmitting (i.e. by providing an index of the last entry).

By maintaining this as a FIFO in the device itself, the device will detect immediately when new packets are to be transmitted, and can even start prefetching data if required (though the packet transmit would not start until all buffers are in the FIFO).

Status Ring

Figure 7:
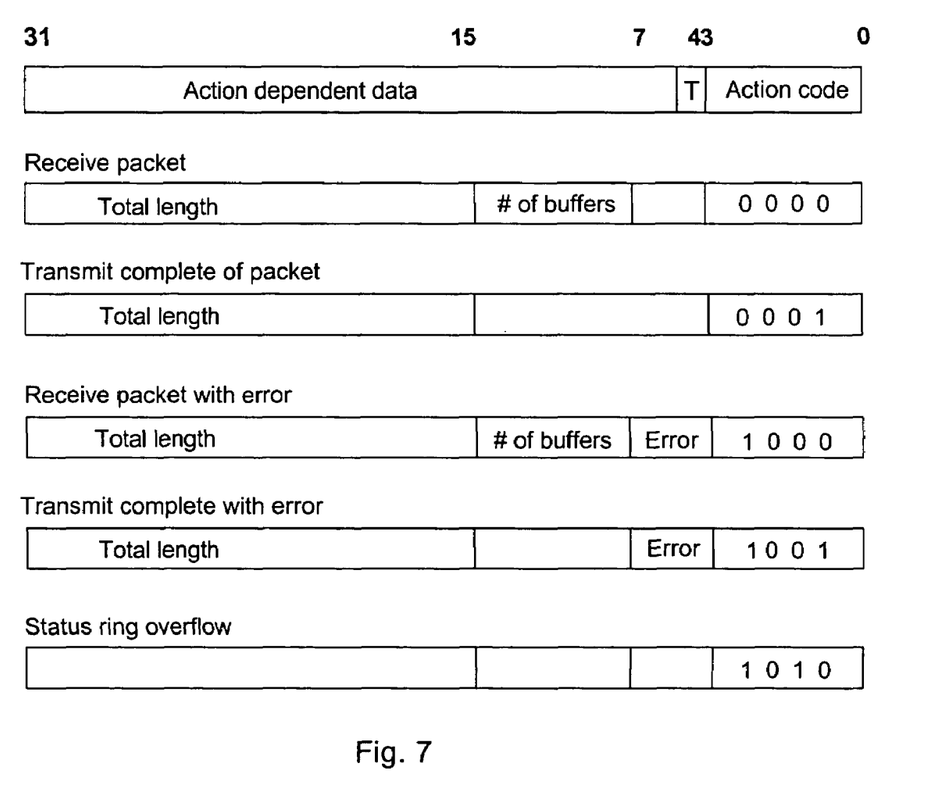
FIG. 7 is a diagram depicting the format of a status ring entry in an embodiment of the invention.

The status ring is an array that is written by the device and read by the CPU. It is used as the primary means of passing status information to the CPU about received and transmitted packets and any error events. FIG. 7 depicts the format of entries in the status ring, where each entry is a 32 bit wide discriminated union, with the discriminator being a N (~4) bit action code.

Other device status events could be included in the status ring as well by defining separate action codes. Because the status ring entry is only 32 bits, a number can be prefetched as one block if a cached view of the status ring is used. Each entry contains an action code, and a T (toggle) bit. The toggle bit operates instead of an OWN bit, and indicates the current end of the ring. When the device writes the first pass of the status ring, the T bit is set to 1, and on the next pass, it is set to 0. So subsequent passes toggle the T bit, indicating how far the ring processing has proceeded.

Receive Processing

Initialization.

To set the device up for receive processing, the CPU will allocate and populate the RX buffer pool with scatter/gather buffers, allocate the status ring, and preset the device with the addresses and sizes of these resources. The Buffer Pool count register will be preset with the count of buffers, and the Free Status Ring Entries register set with the number of entries in the status ring. The CPU maintains a private shadow copy of the scatter/gather buffers in the same order that the buffers were placed on the Buffer Pool array.

Packet Reception.

The following steps occur when a packet is received:
1. The device will prefetch one or more buffer pool entries ready for packet reception.
2. Once data is being received, the data is transferred to the scatter/gather buffers. A count is kept of the number of buffers used. Each used buffer will decrement the Buffer Pool count. If this decrements to zero, an overrun may occur since no more buffers are available.
3. Once the packet has been fully received, a status ring entry is written containing the length of packet, and the number of buffers used in the packet. The Free Status Ring Entries register is decremented, and an interrupt can be asserted to the CPU.
4. When the CPU receive interrupt is serviced, the next status ring entry is retrieved and processed. Assuming it is a Packet Received action, the CPU will use the buffer count value to determine how many of the scatter/gather elements to use from the shadow buffer list.
5. The packet can then be processed by the CPU.
6. At some point, the CPU will replenish the Buffer Pool array. Multiple buffers can be placed on the array, and the count of new buffers written to the RX Buffer Pool Count register.
7. After processing some number of status ring entries, a count of the number processed is written to the Free Status Ring Entries register so that the device knows new status entries are able to be used. The toggle bit is used to determine when the end of the current list of valid entries is reached.

Transmission

Initialization

There is little initialization required for transmission. The CPU will maintain a shadow variable which is initialized by reading the Tx FIFO Free Entries register.

Packet Transmission.

The following steps are taken when a packet is to be transmitted:
1. The number of scatter/gather buffers in the packet must be less than the shadow variable representing the number of free FIFO entries. If there are not enough entries, the variable is updated by reading the Tx FIFO Free Entries register. If the updated variable still indicates not enough room, the packet can be separately queued.
2. For each buffer in the packet, a transmit descriptor is written to the Tx FIFO, with the first buffer having the Start bit set, and the last buffer having the End bit set.
3. Once the descriptor with the End bit set is written to the FIFO, the packet can be enabled for transmission.
4. The packet scatter/gather buffers are kept in a shadow list in the order they were sent to the device.
5. Some time later, after the packet has completed transmission, the device will write a transmit complete entry into the status ring, and assert a CPU interrupt.
6. When the CPU is processing the status ring as a result of the CPU interrupt, and a transmit complete entry is available, the next packet on the shadow transmit list can be processed as having been transmitted.

Multiple Interfaces or Line Cards

Figure 8:
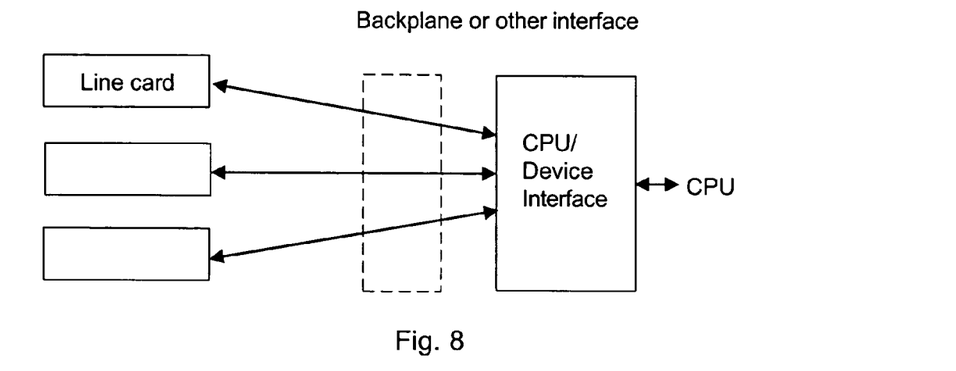
FIG. 8 is a block diagram depicting an interface between multiple interfaces and a CPU.

In some situations, the network device is a multiplexer for one or more individual interfaces or line cards as depicted in FIG. 8.

As an example, in the c7304 router, manufactured by the assignee of the present application, data is streaming from 4 line cards through individual backplane serial paths towards the processing engine. Data from different paths is multiplexed into one streaming path by the backplane interface on the processing engine and delivered as packets into the processor memory. The use of a single device interface allows the processing engine to efficiently deal with the incoming data. This multiplexing will function correctly as long as the processing engine can keep up with the incoming data rate. However, in the case where the processing engine cannot process the incoming packets fast enough, a situation can occur where a line card with higher bandwidth can monopolize the processing engine's resources and starve lower bandwidth line cards. So a scheme must be devised that allocates and manages the bandwidth appropriately.

As an example, consider a system that contains a high-speed line card and a lower-speed line card. If the device interface did not contain some form of fairness allocation, it would be possible for the interface of the high-speed line card to completely fill the ingress receive buffer pool, locking out the low-speed line card from delivering any packets. Even if the backplane interface services the line cards in a fair way, the fact that the interface resources in the processing engine are oversubscribed means that it is possible for the higher speed interfaces to monopolize the resources unfairly.

The embodiment presently being described solves the problem of data starvation of a low bandwidth line card by a high bandwidth line card when the processing engine cannot consume at the incoming data rate. To prevent a high bandwidth line card from starving the low bandwidth line card, the concept of budget is introduced on the receive interface. Each line card is allocated a budget of the receive buffers, and the line card is not permitted to transfer more than this number of packets or buffers.

The budget per line card is a ratio of the line card bandwidth to the total bandwidth of all the line cards present in the system, scaled to the receive interface buffer resources. If a line card is hotswapped, the budget for each line card in the system is recomputed and updated. The per line card budget is programmed into the receive interface hardware by the software during initialization of the line cards (either at startup or at line card insertion). The receive interface has a budget counter per line card, as well as the RX Buffer Counter previously described.

When the CPU processes packets from a particular line card, the CPU will update the budget counter for that line card by writing a count of the number of buffers being processed to that budget counter register, this will return credit to that line card, and has a secondary effect of also incrementing the global Rx Buffer counter at the same time. Every time that the device interface receives a packet from a line card and places it in a receive buffer, the budget counter for that line card is decremented, and the global RX Buffer Counter is also decremented. If a budget counter is zero or less for a particular line card, or if the global RX Buffer Counter is zero or less, any packets from that line card will be dropped. If the budget counter drops to zero or below during the transfer of a packet (that spans multiple buffers), the packet is allowed to transfer completely, i.e., the budget counter is allowed to go negative as a result of a large packet with multiple buffers.

Once the CPU processes the packet, the budget count will be updated. The common counter and the line card budget counters together allow the software to recompute and apply changes to the line card budgets when line cards are either online inserted or removed. This scheme guarantees processor engine resources for a low bandwidth line card and prevents starvation from high bandwidth line card. If high priority packets are required, a separate high priority status ring and buffer pool can be supported, with separate counters for the high priority budget counters.

Hardware Assist to Accelerate Packet Transmission

Figure 9:
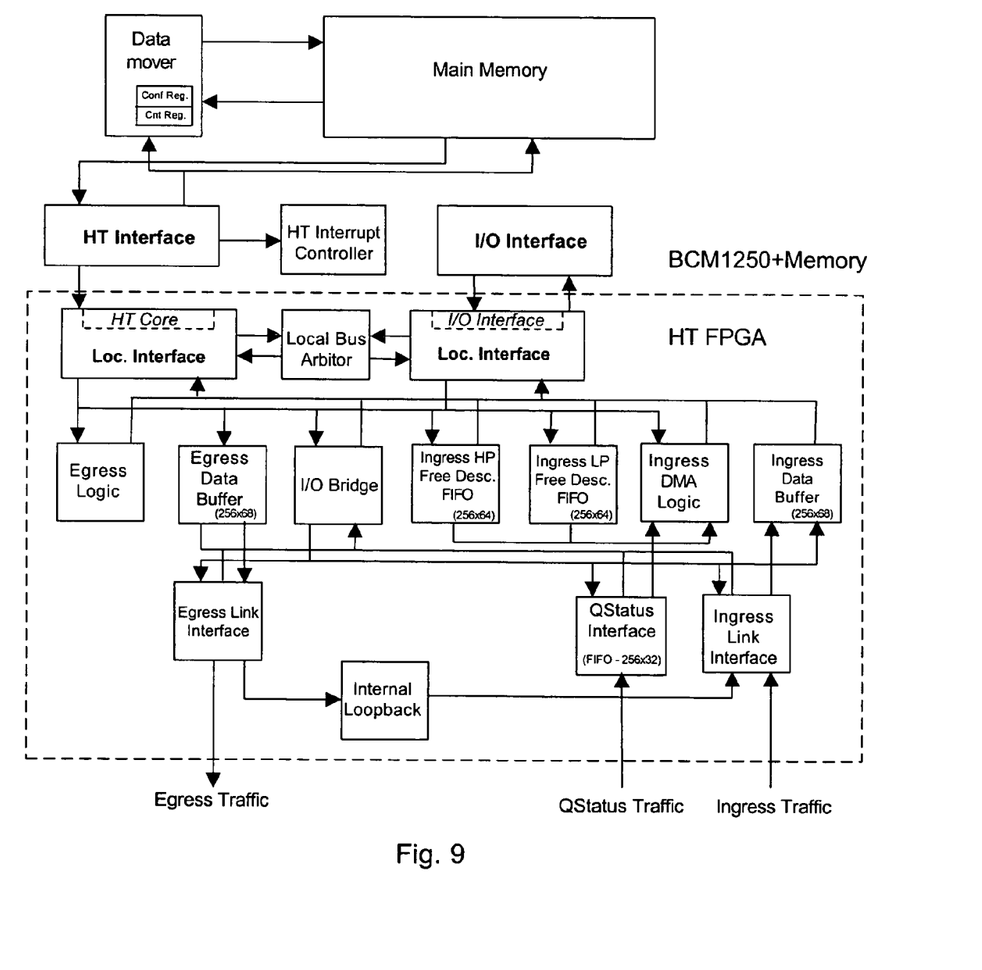
FIG. 9 is a block diagram of a system including an interface module (HT-FPGA) interfacing the line cards and a high speed data bus coupled to the processor's data mover and memory.

A system for implementing an embodiment of the hardware assisted packet transmission is depicted in FIG. 9. The presently described embodiment will be described, by way of example, not limitation, with reference to a system based on the SiByte 1250 system on a chip. The SiByte 1250 has two SB-1 high performance MIPS64 CPUs and includes the 133 Mhz SDRAM memory controller, data mover, three GE macs, a PCI bus interface, and an HT bus interface.

An HT-FPGA, interfaces the BCM1250 HyperTransport® Interface to the a line card (LC) interface for QStatus, Transmit, and Receive traffic. The HT-FPGA connects to a line card interface Transmit Link, Receive Link, and QStatus Interfaces. Processor access over the HyperTransport® or I/O interfaces to FPGA internal resources are I/O mapped. The I/O interface provides an alternate route to FPGA internal resources. The HyperTransport® interface is a packet-based link implemented on two unidirectional interfaces.

In this embodiment, the packet transfers over the HyperTransport® interface use a "push" type architecture, to minimize the amount of system read latency. Both read and write cycles by the Processor and HT-FPGA are supported over the HyperTransport® interface. Byte alignment for packet or buffer transfers over the HyperTransport® interface is dependent on the traffic direction. Egress packet and buffer transfers are byte aligned.

As described above, the transmit and status rings are maintained in memory. Packet transfers in the egress direction are initiated by software writing the packet descriptors to the transmit rings, then writing the number of entries placed on the ring to the corresponding FPGA transmit count register. The number of entries is added to the current value in the FPGA transmit buffer count.

In the egress direction, the actual packet transfer over the HyperTransport® interface is performed by one of the BCM1250 Data Movers, which is dedicated for the FPGA use. The data mover has a separate descriptor ring, which is written by the FPGA, to control the transmission of packets. Writes to the data mover's registers are performed under FPGA control. Software writes to data mover registers are performed indirectly through an FPGA registers. There are no restrictions on software reading the data mover registers. All buffer transfers from packet memory are to an address region in the FPGA. The data mover descriptor ring is in processor memory. Software must allocate and initialize the memory before enabling the data mover operation.

When sensing a transmit count value of non-zero, the FPGA starts reading the packet descriptors from the corresponding transmit ring, on a packet by packet basis. High priority ring transfers will be performed before low priority ring transfers. Each 64 bit entry read from the transmit ring is translated into a data mover descriptor entry. It is then written back to the data mover descriptor ring as two 64 bit entries. For buffer transfers greater than 1 k bytes, the FPGA will transfer the buffer using multiple data mover descriptor entries. The FPGA continues to transfer entries from the transmit ring to the data mover ring until it detects the end of the packet. The number of entries added to the data mover ring is then written to the data mover count register. Writing to the data mover count register passes control of those entries to the data mover, which initiates the packet transfer.

The data mover, after being passed control of the ring entries, starts reading the data from packet memory and writing them over the HyperTransport® interface to the FPGA. The packets are written into the egress data FIFO, along with start and end of packet flags. After detecting an end of packet, the FPGA terminates the current packet transfer by setting the end of packet flag. The transmit status is then written to the corresponding status ring. The next data transfer will indicate the start of a new packet.

In the transmit direction, the HyperTransport® buffer flow is controlled by the FPGA, by controlling the number of descriptors added to the data mover descriptor ring. The FPGA keeps track of the number of data mover transfers pending and the amount of free space in the egress buffer. Data mover descriptors are written to the ring only when there is sufficient space available to support the transfer.

Figure 10:
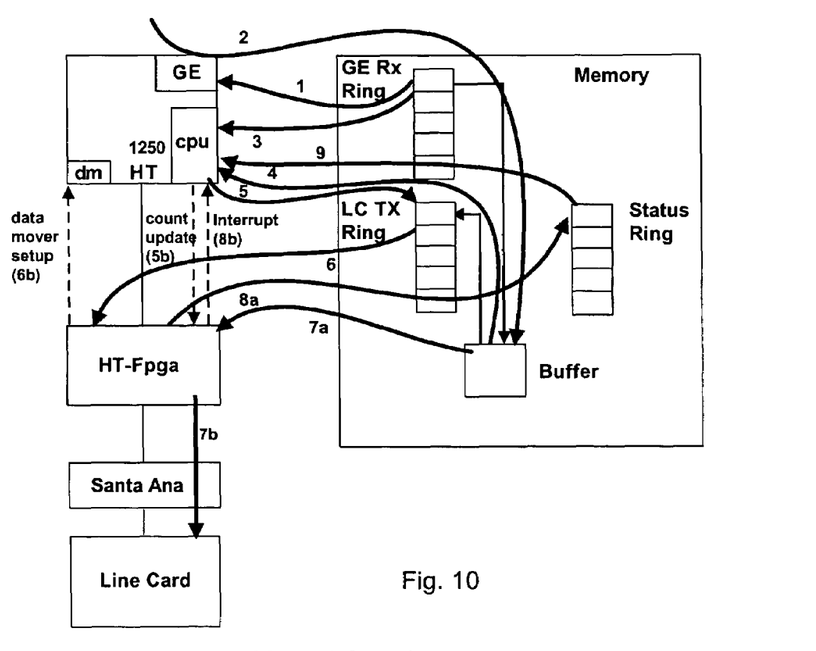
FIG. 10 is a block diagram depicting processes performed by an embodiment of the invention during packet transmission.

The following outlines the packet flow from the GE (Gigabit Ethernet) port on the 1250 to the line card through HT-FPGA, as shown in depicted in FIG. 10. The CPU sets up the LC (line card), GE (Gigabit Ethernet), and status rings. The status ring is shared between the ingress and the egress flow. This reduces the number of ring lookups and manipulations and hence improves performance. It provides the FPGA with the count of free status entries in the status ring and the GE dma engine with the free receive descriptor entries. The CPU also initializes the data mover descriptor ring, which is exclusively used by the FPGA.

1. The GE dma engine reads buffer addresses from the GE Rx ring.
2. The GE dma engine, on reception of a packet, dma's the data into one or more receive buffers, updates the status in the descriptors and interrupts the CPU.
3. The CPU reads the status and gathers the buffers into a packet.
4. CPU reads in the packet header and processes the packet. It determines the outgoing interface to be LC.
5. The CPU checks the packet header to determine packet priority. If it is a high priority packet then the CPU puts the particle buffers into the high priority LC Tx ring, otherwise the CPU puts the particle buffers on the low priority LC Tx ring, one entry per particle buffer. If the packet is contiguous, the CPU breaks the buffer into multiple entries on the Tx ring. It then writes the count of entries to the FPGA (5b).
6. On detecting the count write by the CPU, the FPGA reads the LC Tx ring, getting the buffer addresses and length. It then sets up the data mover descriptor ring (6b) and initiates transmit to LC.
7. The data mover reads each buffer and sends the data over the HT bus to the FPGA (7a), and the FPGA forwards this data to the line card (7b). This method takes advantage of the write efficiency (compared to read) of the HT bus.
8. After the entire packet is transferred, the FPGA updates the packet status (one entry) into the status ring (8a) and interrupts the CPU (8b).
9. The CPU reads the status and releases the packet and its buffers for reuse.

HT transfers are more efficient for word transmissions than for byte transmissions. The HT-FPGA makes use of word transmission. However, the packet data presented by the CPU in the various buffers lined up for transmission is not word aligned. The HT-FPGA programs the data mover to always transfer data as word aligned over the HT bus. It then adjusts and coalesces the data on the fly without loss of cycles.

On getting indication of data for transmission, the HT-FPGA reads the transmit ring descriptor for data buffer and control information. It then programs the data mover descriptor ring to control the transfer of the packet to the HT-FPGA, using a defined address region. The destination address is used to pass packet information to the egress data packing logic. Data mover destination address information includes EOP, packet buffer transfer size, packet buffer transition flag, data mover buffer transition flag, and packet priority. Packet byte alignment when transitioning from one data mover buffer to the next is controlled using the source starting address adjusted to byte alignment.

The data mover transfer size will always end on 8 byte boundaries. The HT-FPGA will adjust the data mover transfer length for any padded data to the start and end of the transfer.

Egress traffic byte realignment is performed by the data mover. The FPGA adjusts the starting source address for each data mover transfer for realignment of the byte lanes to match the previous transfer. The data mover is configured to increment the source address during the transfer. The amount the source address is adjusted is based on the previous transfer adjustment and the current transfer size, using the following formula:

Byte Lane Adj. (3 bits)={Previous Byte Lane Adj. (3 bits)+Transfer Length[2:0]}ANDed 0x007.

The destination address packet buffer transfer size reflects only the size of the packet data in the data mover transfer. The egress data packing logic removes the extra non-packet data transmitted when reconstructing the transmitted packet. After the transmission is complete the HT-FPGA writes the transmit complete status to a separate status ring and notifies the CPU with a transmit complete interrupt.

Egress flow control is implemented by the HT-FPGA by controlling the number of descriptors added to the data mover descriptor ring. The HT-FPGA calculates the amount of storage available for the data mover transfer. If there is sufficient room available for the data transfer to be performed by the descriptor, the descriptor entry is written to the data mover descriptor ring with control of that descriptor being passed to the data mover. Transmit descriptor ring entries for packet buffer transfer sizes larger than a defined size are broken into multiple data mover descriptor entries for transfer.

Thus, the HT-FPGA egress path design assists the software in accelerating data transmission and reducing overhead. The CPU is not involved in packet transmission, thereby saving precious CPU cycles and improving throughput. Also, time is saved by not writing to the device since the CPU reads and writes only to cached memory.

Although the description above is specific to the 1250 the general principles are applicable to other systems where write efficiency is greater than read efficiency.

Hardware Assist to Accelerate High-Level Packet Flow Control

An embodiment of the invention will now be described, by way of example, not limitation, that utilizes a processor module, such as the Broadcom 1250 processor module, connected to an interface FPGA over a high-speed bus, such as the HyperTransport® (HT) bus, which allows for direct access to main memory and the Broadcom 1250 internal resources by the interface HT-FPGA.

Figure 11:
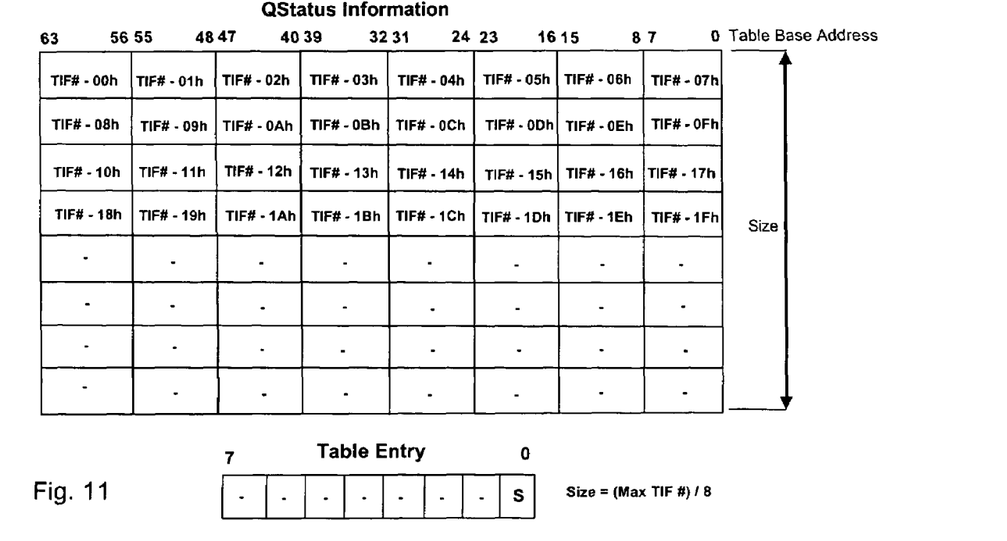
FIG. 11 is a diagram of an xon/xoff table.

In this embodiment, the xon/xoff table resides in main memory and is updated directly by the HT-FPGA. The xon/xoff table is depicted in FIG. 11 and each xon/xoff table entry is byte wide and is accessed using byte addressing from the CPU or HT interface. The individual interface number, plus a base address, is used to create a byte address offset into the table for access by the CPU or HT-FPGA.

The HT-FPGA writes interface status to the xon/xoff table directly using HT byte write cycles, without CPU intervention. Updating of table entries is performed by the CPU only during interface initialization, otherwise all writes to the table are performed by the HT-FPGA thus freeing the CPU from the tasks of polling the interfaces and maintaining the xon/xoff table.

Figure 12:
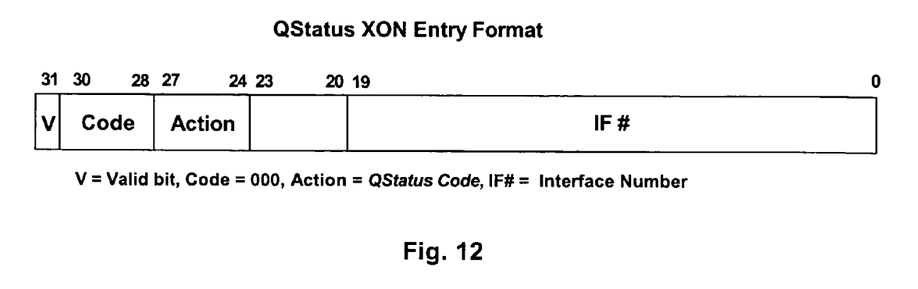
FIG. 12 is a diagram of an entry to the xon status table.

To assist in the transition of an interface from an xoff to xon status, an additional xon status ring is created in main memory to pass only xoff to xon transition status to the CPU. After updating the interface xon/xoff table entry, the HT-FPGA writes the interface and action code to the xon status ring, and then interrupts the CPU. The format of the xon/xoff status ring entry is depicted in FIG. 12.

Figure 13:
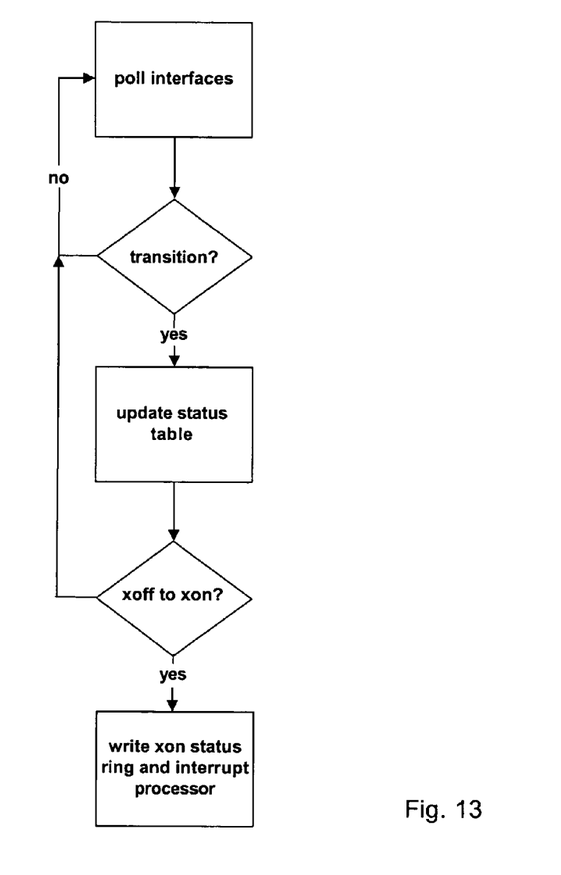
FIG. 13 is a flow chart depicting steps for maintaining the xon/xoff table and xon status ring.

Thus, as depicted in the flow chart of FIG. 13, when processing xoff information, the FPGA updates the xon/xoff table directly by performing byte writes to memory. No further action is required by the FPGA when servicing an xoff condition.

When processing xon information, the FPGA upgrades the xon/xoff table directly by performing byte writes to memory, then writes the xon status to the xon status ring. After writing the xon status information to the ring, the FPGA interrupts the processor. A valid bit toggles on each pass through the ring.

The FPGA maintains the current write pointer, starting address, and size of the xon status ring. The FPGA also maintains a count of xon/xoff entries waiting to be processed. A full condition is determined when the number of entries on the ring equals the size of the ring.

After receiving the interrupt the CPU then processes the xon status ring entry, checking the holding queue for packets waiting transmission to the interface. After processing the xon status entries, the CPU acknowledges the xon status entries by writing the number of entries processed back to the HT-FPGA. Having the CPU write the number of entries processed back to the HT-FPGA insures the HT-FPGA does not over-write xon status entries before the CPU has had time to process ring entries.

A valid bit included in the status entry provides a mechanism to allow the CPU to know which entries have been updated by the HT-FPGA. The state of the valid bit toggles on each transition around the ring. The HT-FPGA performs table and ring accesses directly to L2 cache. Having the xon/xoff table and xon status ring in L2 cache improves overall system performance.

Thus a system is described where precious CPU cycles and time are saved by not having to maintain the xon/xoff status table changes and only having to process the xon status changes. Having the CPU read and write only to cached memory also improves performance.

The invention has now been described with reference to the preferred embodiments. Alternatives and substitutions will now be apparent to persons of skill in the art. For example, as is know in the art, there are a number of variations that can occur on this basic design, such as the following:

1. Other types of device events can be placed in the status ring, such as QoS (Quality of Service) events etc.
2. Multiple interfaces can all use the same device interface by sharing the same Rx Buffer Pool and status ring, though it would be likely that each interface would require a separate Tx FIFO to prevent head of line blocking.

3. If a priority scheme were required, multiple sets of resources (Tx FIFO, Status ring etc.) could be implemented, though this would require the CPU to read and process multiple rings.
4. Instead of a toggle bit in the status ring, the device could present a register with the current status entry; this involves the CPU reading the register at the start of processing the status ring, which may be more expensive than using a toggle bit.

Additionally, several of the embodiments have been described in implementations utilizing the HT (HyperTransport®) bus and a Broadcom 1250 processor. However, as understood by persons of skill in the art, the invention has broad applicability in other systems having similar read latency characteristics. Accordingly, it is not intended to limit the invention except as provided by the appended claims.

What is claimed is:

1. An interface for a network device and a CPU, with the interface including a shared memory comprising:
   a Rx buffer pool, maintained in the shared memory and which is write-only by the CPU and read-only by the device, comprising a plurality of buffer pool entries, each entry holding an address and length value of a scatter-gather buffer;
   a transmit FIFO pool which is write-only by the CPU and read-only by the device, with each FIFO pool entry holding a buffer length, start field, end field, and buffer address field;
   a status ring, maintained in shared memory, separate from the Rx buffer pool and transmit FIFO pool, and which is read-only by the CPU and write-only by the device, with each status ring entry holding status information written by the device and a toggle bit which holds a value which is changed by the device each time the device accesses the status ring; and
   a private memory, accessible only by the CPU, with the private memory holding a shadow copy of the scatter/gather buffers, in software-friendly form, included in the received buffer pool and a shadow count of the number of available of Tx FIFO entries.

2. The interface of claim 1 where:
   the transmit FIFO pool is maintained on the device.

3. An interface for a network device and a CPU, with the interface including a shared memory comprising:
   a Rx buffer pool, maintained in the shared memory and which is write-only by the CPU, comprising a plurality of buffer pool entries, each entry holding an address and length value of a scatter-gather buffer;
   a transmit FIFO pool, maintained on the device, which is write-only by the CPU, with each FIFO pool entry holding a buffer length, start field, end field, and buffer address field;
   a status ring, maintained in shared memory, separate from the Rx buffer pool and the transmit FIFO pool, and which is read-only by the CPU and write-only by the device, with each status ring entry holding status information written by the device and a toggle bit which holds a value which is changed by the device each time the device accesses;
   an Rx buffer pool register, maintained in the device, which is write-only by the CPU, for holding an Rx buffer count value indicating the number of scatter/buffer registers available for received packets;
   a Tx FIFO free entries register, maintained in the device, which is read-only by the CPU, for holding a Tx FIFO value indicating the number of transmit FIFO pool entries available for transmitted packets;
   a Free Status ring register, maintained in the device, which is write-only by the CPU, for holding a status count value indicating the number of status ring entries available to the device;
   a private memory, accessible only by the CPU, with the private memory holding a shadow copy of the scatter/gather buffers placed in the received buffer pool and a shadow count of the number of available Tx FIFO entries.

* * * * *